May 5, 1931. W. E. WOODARD 1,803,987
LOCOMOTIVE DRIVING CONNECTION
Filed Aug. 27, 1928
Fig. 1.
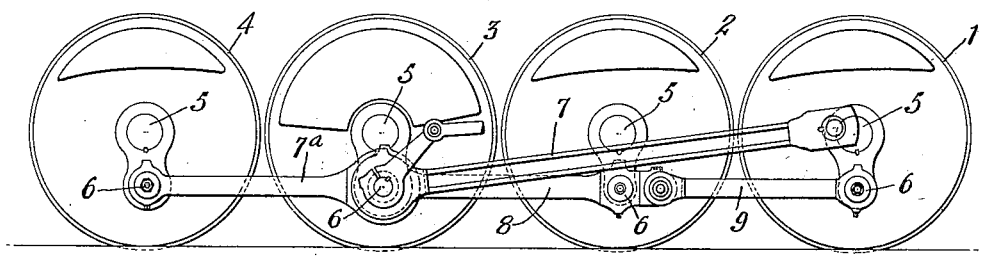
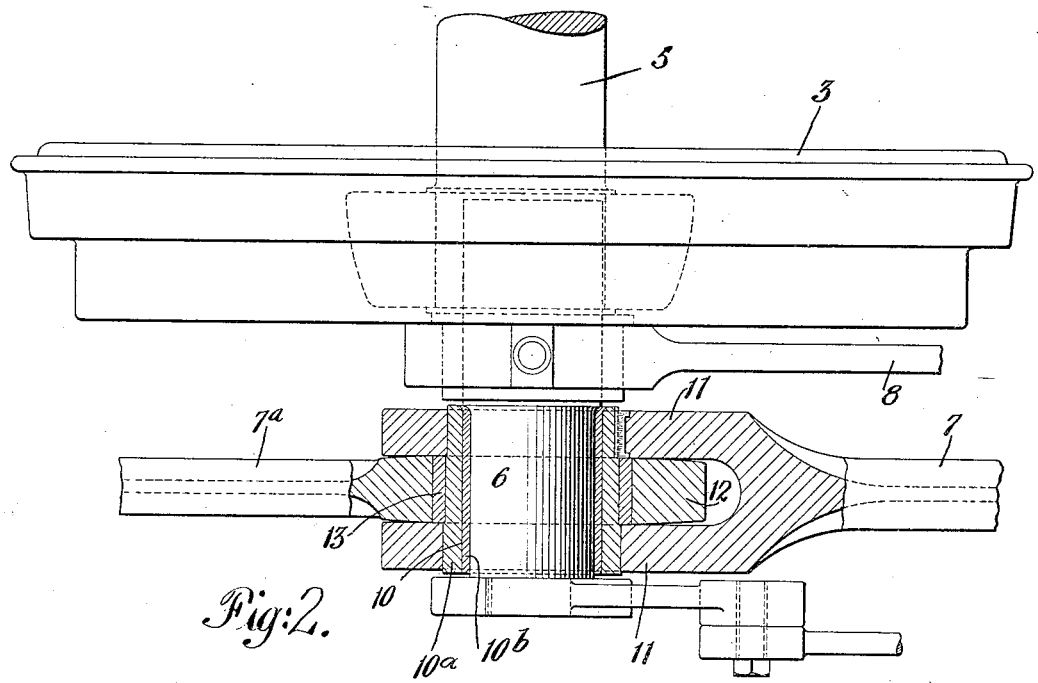
Fig. 2.
INVENTOR
William E. Woodard
BY
Synnestvedt & Lechner
ATTORNEYS Patented May 5, 1931

1,803,987

UNITED STATES PATENT OFFICE

WILLIAM E. WOODARD, OF FOREST HILLS, NEW YORK

LOCOMOTIVE DRIVING CONNECTION

Application filed August 27, 1928. Serial No. 302,315.

This invention relates to locomotive driving connections, and is particularly concerned with articulated rod construction.

The invention contemplates the reduction in the weight of the reciprocating parts of locomotive driving mechanism, the simplification of the construction thereof, the improvement of the operation of such mechanism, and the minimization of the cost of maintenance and repair.

More specifically, I aim by my invention to improve articulated rod construction by reducing the size and weight of the parts, and the number of parts employed, while at the same time maintaining the requisite strength and insuring the proper operation of the mechanism in service.

In the construction of articulated driving rods as now known in the art, it has been the practice to provide one rod member with a bifurcated or forked end and the adjacent rod member with a head adapted to fit in the jaws of the bifurcated member, and to provide, in the apertures in said ends, a steel bushing which connects the rod members and transmits thrust from one to the other. All of these parts have been made of such size and diameter that a floating bronze bushing could be inserted between the steel bushing and the driving wheel pin.

By my construction, as will presently appear, I am enabled to reduce the inside diameter of the steel bushing for a given-sized driving wheel pin, and in consequence its outside diameter also, with the result that the apertures in which the bushing is mounted may be of smaller diameter which makes possible a reduction in the total outside dimensions of the head and the jaws of the fork on the respective rod members. Furthermore, these reductions, since they effect a reduction in weight, may be utilized to attain either of the following results, or a combination of both: first, a greater factor of safety may be obtained, with an attendant reduction in frictional heat on the pin, and second, a reduction may be made in the size of the driving wheel pin itself, if desired, as compared to the size which would otherwise be required. These results are of great practical advantage, particularly where a large number of drivers are driven from one set of cylinders and the reciprocating and rotating parts are near the maximum allowable size and weight limit.

A further advantage, resulting from the construction, is the improvement in conditions of counterbalance on the main driver—in this case No. 3 driver—which is always difficult to counterbalance properly.

How these results, and such other objects and advantages as are incident to the invention, are obtained, will be clear from the following description, taken together with the accompanying drawings, in which:

Figure 1 is a side elevational view of a set of locomotive driving wheels having a driving construction embodying my invention; and Figure 2 is an enlarged plan view of No. 3 driver of Fig. 1, with the associated articulated driving connection shown in section.

For purposes of illustration I have shown four drivers, 1, 2, 3 and 4, on the right side of a locomotive (although it is to be understood that the invention is applicable to other wheel arrangements), said drivers being mounted on axles 5 and having each a crank-pin 6. An articulated main rod 7, 7a, driven from the usual cross-head (not shown) distributes its thrust directly between a plurality of driver pins, in this case the pins of Nos. 3 and 4 drivers. Drivers 1 and 2 are driven from driver 3 by side rods 8, 9, and it will be understood that additional drivers may be placed behind driver 4 and similarly driven therefrom.

The members 7, 7a, of the main rod, are articulated together, for the transmission of thrust from one to the other, by the bushing 10, which passes through apertures in the jaws 11 and in the head 12 on the respective rod members, with a tight fit in one of said members and a rotative or bearing fit in the other. As here shown, the bushing 10 is designed to have a bearing fit with the brass 13 in the eye of head 12.

In accordance with the present invention, the bushing 10 is a composite member made up of a sleeve 10a, of steel or other suitable hard material for transmitting thrust directly from member 7 to member 7a, and a lining 10b of bearing or anti-friction metal. This lining is preferably cast or processed on the interior of the sleeve 10a, and, being therefore in firm contact with said sleeve at all points, may be made very thin, preferably just thick enough to allow for the usual wear.

It is evident that the steel sleeve portion of the bushing must be of sufficient thickness to transfer piston thrusts from one member of the tandem rod to the other, and therefore its thickness cannot be reduced beyond well defined limits. By the use of the thin bearing lining, as described, the requisite thickness of the steel bushing is obtained with a reduction in the overall or outside dimension thereof, and the size and weight of the head 12 and jaws 11, of the rod members, are correspondingly reduced. The other advantages previously set forth, follow as a natural consequence.

What I claim is:—

1. A multi-part main driving rod for locomotive driving wheels, having adjacent parts of solid-headed construction, one head being bifurcated and the other fitting in the bifurcation and each apertured to receive a driving wheel crank pin, a rigid bushing extending through the apertures and pressed into the apertures of the bifurcated head whereby the parts are articulated together as an operative unit for unitary application to and removal from the pin, and an internal anti-friction lining in said bushing forming therewith a unified composite sleeve, whereby all the parts may be reduced in diameter and weight for a given rod thrust.

2. A multi-part main driving rod for locomotive driving wheels, having adjacent parts of solid-headed construction, one head being bifurcated and the other fitting in the bifurcation and each apertured to receive a driving wheel crank pin, a rigid bushing extending through the apertures and pressed into the apertures of the bifurcated head whereby the parts are articulated together as an operative unit for unitary application to and removal from the pin, and an internal anti-friction lining in said bushing forming therewith a unified composite sleeve, said lining being relatively thin as compared to the thickness of the rigid portion of the sleeve, whereby all the parts may be reduced in diameter and weight for a given rod thrust.

In testimony whereof I have hereunto signed my name.

WILLIAM E. WOODARD.